United States Patent Office 2,822,281
Patented Feb. 4, 1958

2,822,281

OPAQUE WATER COLOR COMPOSITIONS AND METHOD OF MAKING SAME

Alexander S. Masley, Albuquerque, N. Mex., assignor of thirty-three and one-third percent to Henry Heyman, Los Alamos County, N. Mex.

No Drawing. Application October 26, 1953
Serial No. 388,460

5 Claims. (Cl. 106—298)

This application is a continuation-in-part of application Ser. No. 318,966, filed March 5, 1952, now abandoned.

This invention relates to artists' brush paints and more particularly to artists' paints or opaque color preparations which are mixed with water for use.

In the prior art of water-mix artists' paints, the paint mixtures are available as powders, pastes and cakes. The users of artists' paints are subjected to numerous disadvantages which pertain to each of these forms in preparing the product for use by the artist.

In particular a large proportion of artists' paint supplies are utilized by groups such as, for example, in schools by young persons in undergoing painting experiences under the general guidance of teachers in the classrooms.

Under such conditions, a large variety of paint mixtures of various quantities must be prepared for the individuals of the group. The necessary measuring and careful parceling out of different needed colors, for a number of users is time consuming thereby causing a loss in the proper utilization of the talents of the teacher or art instructor. Further, the chore of parceling out the colors cannot be delegated to less experienced hands because of the need of experience in selecting proportions of selected colors to obtain desired blends, and further, because it is necessary to exercise considerable care in parceling out the paints, particularly in powder form, to prevent the annoyance and expense occasioned by spillage.

Other disadvantages pertain to paint preparations as presently available. The paste preparations dry out in the jars or tubes thereby causing waste and expensive replacement. Opaque paint box cakes are slow to work into a paint mixture of sufficient opaqueness requiring considerable time and effort of mixing to obtain an acceptable opaque effect, also blending between several colors is inconvenient.

Further, the present paint preparations in powder or paste form tend to deteriorate due to molding unless protected by a preservative. Even with such protection it is not uncommon to find powder paints to which water has been added and worked into paste form developing a disagreeable odor if left standing between periods of use.

Various difficulties, some of which are above-enumerated, connected with artists' paint preparations as presently available result in considerable waste of materials and considerable waste both of teacher's and of pupil's time.

It is a prime objective of this invention to provide water-mix artists' paint preparations in a form which eliminates the inconveniences inherent in the prior art preparations.

It is another objective of this invention to provide artists' paint preparations in a form which eliminates expensive packaging and all danger of spillage.

These and other objectives which will become apparent as the description proceeds are accomplished by my invention in accordance with which tablets of paints are provided which substantially instantaneously mix with or dissolve in water.

It has been suggested in the prior art that coloring matter for house paints can be prepared in tablet form containing substances which cause violent effervescing. The effervescing action caused disintegration of the tablet and stimulates mixing with a volume of water. Such preparations, such as for example that of Cornelison, United States Patent 1,244,033 are suitable for house paints, but are totally unsuitable for artists' paints. It has been found that the presence of bubbles in artists' paint result in a very inferior paint preparation. An opaque paint not only requires a homogeneous mixture of the constituents of the paint in water but also requires a substantially total freedom from bubbles.

It has been suggested in the prior art, notably in United States Patent 1,450,865 that tablets of effervescent and non-effervescent nature of various substances can be made. The process therein described is dependent upon mixing substances with effervescent salts and heating the substance to a certain definite temperature to evolve carbon dioxide. The substance so prepared when compressed into tablets are said not to effervesce at lower temperatures and to be soluble because of porosity, but not stable in the presence of moisture.

In the process of making artists' paints it is not desirable to heat the preparation because of deleterious effects on some of the constituents. Accordingly, by my invention, the mixture from which readily dissolvable paint tablets are made is at no time heated to an elevated temperature. Further, it is essential that the tablets remain stable even under very humid conditions. Further it is essential in the preparation of artists' paints that no poisons or other matter which can affect the human body, such as oxalic acid be used.

Accordingly, the above-enumerated teachings which relate to calcimine paints and other water-soluble preparations fail to show any applicability to artists' paints or suggest that artists' paints can be prepared in tablet form, although such preparations are in great need.

I have discovered that artists' water paints can be prepared in readily dispersible tablet form. The tablets disperse almost instantaneously in small quantities of aqueous liquid without occluded gas, and those not used, stay in a good state of preservation indefinitely. A preferred formula and method for preparing artists' paint in tablet form is as follows:

| | |
|---|---|
| Coloring pigment (powder) | grams 10 |
| Commercial ground whiting | do 22 |
| Acacia powder | do 4 |
| Starch powder | do 1 |
| Citric acid powder | do 1 |
| 50% sorbitol-water solution | cc 5 |

It is noted from the above table that there are thirty-eight parts of dry mix, and the percentages of the dry ingredients are as follows:

| | Percent |
|---|---|
| Coloring pigment | 26.32 |
| Ground whiting | 57.90 |
| Acacia powder | 10.52 |
| Starch powder | 2.63 |
| Citric acid powder | 2.63 |

The coloring pigment, whiting, acacia, starch and citric acid are thoroughly mixed together. The sorbitol solution is then added and all the ingredients ground or mulled into a thick paste.

The paste is pressed through a number U. S. 16 screen to produce granules which are ready for pressing into tablet form.

The number 16 screen has the largest desirable interstices and it is even to be preferred that smaller mesh such as U. S. number 30 screen be used.

The granules are placed in a mold and pressed with a pressure of not more than 200 pounds per square inch and preferably between 25 to 100 pounds per square inch.

The tablets formed by pressing are removed from the mold and are in condition for storing or immediate use.

Similar tablets may also be formed using tartaric acid in place of the citric acid.

To use a tablet so formed for painting, water is added. The tablet practically instantaneously swells, absorbing the water and upon a stroke or two of the brush it is a homogeneous paint substantially free of bubbles. The consistency of the mixture is smooth and as opaque as most commercial paste-type tempera paints or mixed powder paints.

The amount of whiting which is utilized for filler purposes can be varied over an appreciable range with a corresponding change in the amount of binder without affecting the character of the paint tablets.

The amount of acacia (gum arabic) is determined by the quality of adhesion to paper desired of the paint mixture. That is, after the paint is spread upon the work it should possess sufficient binder in its composition to hold the pigment particles to the paper and prevent rubbing off when dry.

The use of starch in paint mixtures to aid dispersing in water is common practice in the art. However, in my preparation, the starch has additional functions. It helps to achieve a paste-mixture with a minimum of liquid sorbitol and water mixture prior to granulation. It enhances the ability of the mixture to be forced through the screen for granulation. It helps to hold the small amount of moisture in the granules during the interval between the comminution of the paste and the subsequent molding and pressing step. In addition, the starch appears to improve the consistency of the paint mixture when the tablet is dispersed in water for use as an artist paint.

It has been discovered that close control of the critical amount of citric acid, or other solid, non-toxic acids, and sorbitol-water or other humectant systems can result in a quick disintegrating paint tablet without the formation of active visible effervescence or bubble formation. The exact reason for this is not known but it is probable that the amount of gas tended to be generated is within the dissolving capabilities of the smallest amount of water which can cause disintegration of the tablet. In any case, whether or not the absence of prominent bubbling is due to the aforementioned speculation is immaterial and an understanding of the exact phenomena involved is not essential to the utilization of the discovery.

In any case, an amount of citric acid in excess of the critical amount causes the formation and occlusion of gas bubbles which prohibits the use of the paint for a considerable length of time. Further, bubbles in the mixture cause a deleterious thinning of the paint mixture making it difficult to achieve the immediate desired opaque paint effect.

Further, it has been discovered that tablets using an excess of citric acid not only effervesce but disperse more slowly than tablets utilizing the critical amount of acid which I specify.

Accordingly, the amount of citric acid must be held to within a rather close range to accomplish rapid disintegration of the paint tablet in water without the formation of bubbles. I have determined that the range is within the limits of 2 to 5 percent by weight of solid components in a total paint mixture preparation. For citric acid, this amount is approximately 0.02 to 0.04 equivalent of hydrogen ion per hundred grams of total solid components. When other solid, non-toxic acids are used, amounts yielding comparable amounts of hydrogen ion are to be employed.

Although 50 percent sorbitol-water solution is preferred for the humectant system, other humectant systems such as glycerol-water or other polyhydric alcohol-water systems are also useful. In any case, the amount of sorbitol-water solution called for in the proportions herein given does not permit degeneration of the citric acid. The reason for this is not known but it is probable that in the critical proportions given, the sorbitol has a greater affinity than the commercial solid dry non-toxic acid for the amount of water present.

The tablets so formed in accordance with my invention are preferably scored so that fractions thereof can be readily broken off and used. This feature is particularly desirable because portions of tablets of different colors can be mixed in a desired proportion to obtain a desired color. Moreover, the blended color can always be duplicated by utilizing the same fractions or multiples of the various tablets first so used.

Artists' paint tablets made in accordance with my invention are firm, well-shaped, and negligible in hygroscopicity while at the same time dissolving readily with no significant effervescence when water is added. Tablets made in accordance with the foregoing formula have been subjected to 90 percent humidity for over seventeen hours with no appreciable deleterious effects. The same tablets, when water was added, very quickly disintegrated in a substantially normal manner.

Although my preferred method indicates that tablets are the desired form of prepared solid artists' paint colors these paints can also be formed into sticks of uniform thickness by an extrusion step on the paste.

I have described a quick-dissolving artists' paint and the method for making the same which is inexpensive, effective and practical. The paints so made present an advance in the art for all users of artists' paints and are particularly practical for utilization by young persons in that they are not susceptible to accidents in preparation or use, and are non-poisonous. I have described a preferred embodiment but it is apparent that the proportions and amounts of some of the substances can be varied within limits without departing from the spirit of the invention. Accordingly, the invention is to be construed as limited only by the following claims taken in view of the prior art.

I claim:

1. An artist's water paint tablet consisting essentially of (a) a dry mixture of coloring pigment, whiting, acacia powder, starch powder and a non toxic organic acid capable of releasing in contact with water between about 0.02 and 0.04 equivalent of hydrogen ion for 100 g. of total dry mixture, and (b) a 50 percent sorbitol-water solution, the organic acid being present in an amount equal to between 2 to 5 percent by weight of the dry mixture, the sorbitol-water solution being present in an amount equal to approximately 5 cc. for each 38 parts by weight of the dry mixture and the whiting being present in an amount greater than that required to stoichiometrically combine with the organic acid present.

2. The artist's water paint tablet of claim 1 wherein the organic acid is citric acid.

3. The artist's water paint tablet of claim 1 wherein the organic acid is tartaric acid.

4. An artist's water paint tablet consisting essentially of (a) by weight, approximately 26% of coloring pigment, 58% of whiting, 10% of acacia, 3% of starch, and 3% of citric acid together with (b) a 50% sorbitol-water solution in the proportion of approximately 5 cc. to each 38 grams of the other components.

5. An artist's water paint tablet consisting essentially of (a) by weight, approximately 26% of coloring pigment, 58% of whiting, 10% of acacia, 3% of starch, 3% of tartaric acid together with (b) a 50% sorbitol-water solution in the proportion of approximately 5 cc. to each 38 grams of the other components.

References Cited in the file of this patent

UNITED STATES PATENTS

| | | | |
|---|---|---|---|
| 1,055,720 | Deuel | Mar. 11, | 1913 |
| 1,131,432 | Smith | Mar. 9, | 1915 |
| 1,159,337 | Neben | Nov. 2, | 1915 |
| 2,271,906 | Williams | Feb. 3, | 1942 |

FOREIGN PATENTS

| | | |
|---|---|---|
| 5,862 | Great Britain | 1892 |
| 3,905 | Great Britain | 1910 |
| 12,562 | Australia | 1933 |
| 892,531 | France | Apr. 11, 1944 |

OTHER REFERENCES

"Uses and Applications of Chemicals and Related Materials," Gregory (1939), pp. 564–565. Copy in Div. 63.